(12) United States Patent
Kanagovi et al.

(10) Patent No.: US 11,929,893 B1
(45) Date of Patent: Mar. 12, 2024

(54) UTILIZING CUSTOMER SERVICE INCIDENTS TO RANK SERVER SYSTEM UNDER TEST CONFIGURATIONS BASED ON COMPONENT PRIORITY

(71) Applicant: Dell Products L.P., Round Rock, TX (US)

(72) Inventors: Ramakanth Kanagovi, Hyderabad (IN); Erik Reyes, San Saba, TX (US); Virender Sharma, Austin, TX (US); Guhesh Swaminathan, Chennai (IN); Saheli Saha, Kolkata (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/080,994

(22) Filed: Dec. 14, 2022

(51) Int. Cl.
*H04L 41/507* (2022.01)
*H04L 41/0866* (2022.01)
*H04L 41/16* (2022.01)
*H04L 41/5074* (2022.01)

(52) U.S. Cl.
CPC ........ *H04L 41/507* (2013.01); *H04L 41/0866* (2013.01); *H04L 41/16* (2013.01); *H04L 41/5074* (2013.01)

(58) Field of Classification Search
CPC ... H04L 41/507; H04L 41/0866; H04L 41/16; H04L 41/5074; G06F 11/3058; G06F 11/3409; G06F 8/10; G06F 8/70
See application file for complete search history.

(56) References Cited

U.S. PATENT DOCUMENTS

| | | | |
|---|---|---|---|
| 9,372,770 B2 | 6/2016 | Gururaj et al. | |
| 2015/0220411 A1 | 8/2015 | Shivanna | |
| 2018/0307221 A1* | 10/2018 | Cline | G06Q 10/20 |
| 2018/0324198 A1* | 11/2018 | Borthakur | H04L 63/1425 |
| 2019/0146901 A1* | 5/2019 | Hoover | G06F 16/35 |
| | | | 714/38.1 |
| 2020/0236192 A1* | 7/2020 | Worner | G06N 20/00 |
| 2020/0244563 A1* | 7/2020 | Coupal | H04L 25/03878 |
| 2020/0334577 A1* | 10/2020 | Anderson | G06Q 10/063 |
| 2021/0144233 A1* | 5/2021 | Govan | G06N 20/20 |
| 2022/0190901 A1* | 6/2022 | Hartman | H04L 1/18 |
| 2022/0283784 A1* | 9/2022 | Degen | G06F 8/20 |

\* cited by examiner

*Primary Examiner* — Joseph L Greene
(74) *Attorney, Agent, or Firm* — Larson Newman, LLP

(57) ABSTRACT

An information handling system instantiates a hardware configuration generator to generate platform configurations. The hardware configuration generator provides a ranked list of the platform configurations, receives platform customer service request information, provides a ranked list of part numbers associated with the platform configurations based upon the customer service request information, and modifies the ranked list of platform configurations based upon the ranked list of part numbers.

19 Claims, 3 Drawing Sheets

US 11,929,893 B1

UTILIZING CUSTOMER SERVICE INCIDENTS TO RANK SERVER SYSTEM UNDER TEST CONFIGURATIONS BASED ON COMPONENT PRIORITY

FIELD OF THE DISCLOSURE

This disclosure generally relates to information handling systems, and more particularly relates to the validating server systems utilizing customer service incidents to rank server system under test configurations based on component priority.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include code to instantiate a hardware configuration generator to generate platform configurations. The hardware configuration generator may provide a ranked list of the platform configurations, receive platform customer service request information, provide a ranked list of part numbers associated with the platform configurations based upon the customer service request information, and modify the ranked list of platform configurations based upon the ranked list of part numbers.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
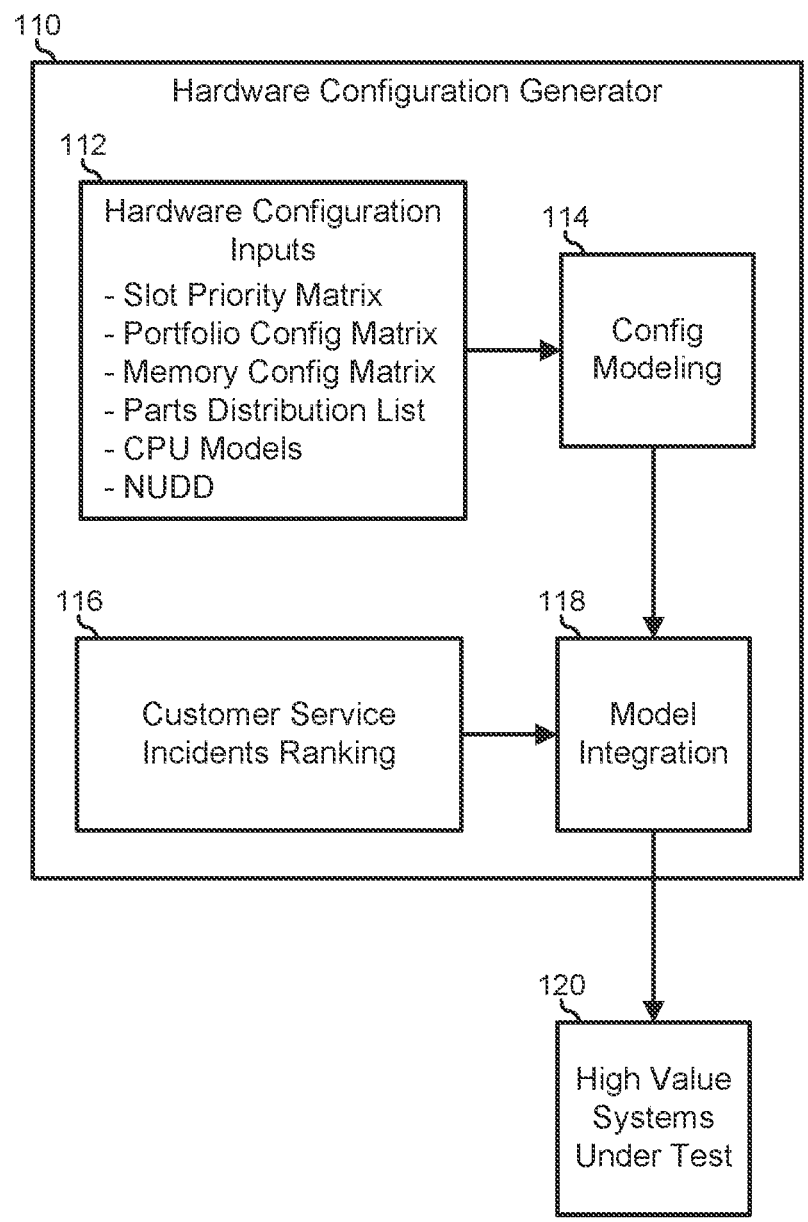
FIG. 1 is a block diagram of an information handling system according to an embodiment of the current disclosure.

FIG. 1 illustrates a platform validation system 100, including a hardware configuration generator 110 that provides high value system under test (SUT) configurations 120. Platform validation provides the manufacturer of information handling systems with a level of assurance that the validated platforms (also referred to as information handling systems) are in conformance with the various functional requirements to which the platforms were designed. Platform validation typically involves the operation of real world information handling systems in various hardware configurations and with various combinations of installed firmware, operating systems, and software. In this regard, platform validation differs from design verification which typically involves design rule checking or other simulations on the components of the information handling systems (for example motherboards, daughter cards, and the like) to ensure the components conformance to the design rules.

Thus a manufacturer's platform validation team typically receives a number of first article versions of a particular platform to test to ensure proper functionality. It is generally understood that validation of every possible combination of hardware and software configurations of a particular platform is impossible due to the large number of combinations. However, it is further understood that a vast number of the combinations represent merely trivial variations on a smaller subset of more representative platform combinations. For example, it may not be deemed necessary to validate a platform with every version of a networking add-in device, and platform validation on a small number of representative networking add-in devices may provide adequate assurance of the platform's compatibility with all such networking add-in devices. Nevertheless, the need to identify a set of high value SUT configurations remains challenging.

Hardware configuration generator 110 represents a configuration management tool that utilizes artificial intelligence/machine learning (AI/ML) techniques to evaluate the myriad possible combinations and to resolve the possibilities into a workable number of SUT configurations 120. Hardware configuration generator 110 includes hardware configuration inputs 112, a configuration modeling module 114, a customer service incidents ranking module 116, and a model integration module 118. Configuration inputs 112 may include a slot priority matrix (SPM), a platform portfolio configuration matrix (PPCM), a memory configuration matrix (MCM), a parts distribution list (PDL), a CPU models list, and a new, unique, distinct, and difficult (NUDD) list. The SPM provides a list of rules and restrictions for populating add-in devices into add-in slots of the platform, such as networking add-in devices, graphics processing units (GPUs), RAID controller, and the like.

The PCCM represents a rulebook for creating base server configurations based upon actual configurations to be sourced by the manufacturer. The MCM represents a rulebook for populating memory slots. The PDL defines all components applicable for a given new platform. The CPU models list includes the CPU models that are supported on the platform. The NUDD list represents items known to the platform validation team that represent unique or particularly challenging configuration variables that may need additional attention. For example, where a platform includes a particular add-in slot that is provided in accordance with a new interface standard, the validation challenges may be understood to be greater, and so the new interface may be subject to additional validation efforts, as needed or desired.

Configuration modeling module 114 operates upon the inputs from hardware configuration inputs 112 to provide a scoring model for the possible platform configurations in terms of priority of testing. In particular, configuration modeling module 114 pre-processes the inputs to determine a list of possible configurations, and provides statistical modeling to create a smaller list of valid configurations. The statistical modeling may include various sampling strategies including random sampling, systematic sampling, stratified sampling, cluster sampling riser sampling, or the like. The list of valid configurations is then subjected to various AI/ML algorithms to compose a ranked list of high value hardware configurations. The AI/ML algorithms may include mapping the list of valid configurations on a Kohonen self-organizing-map, and evaluating the mapped configurations using a singular value decomposition and a K-means clustering algorithm, or other algorithms, as needed or desired. Model integration module 118 combines the output from configuration modeling module 114 (that is the ranked list of high value hardware configurations) with a list of configurations from customer service incidents ranking module 116, as described further below.

Figure 2:
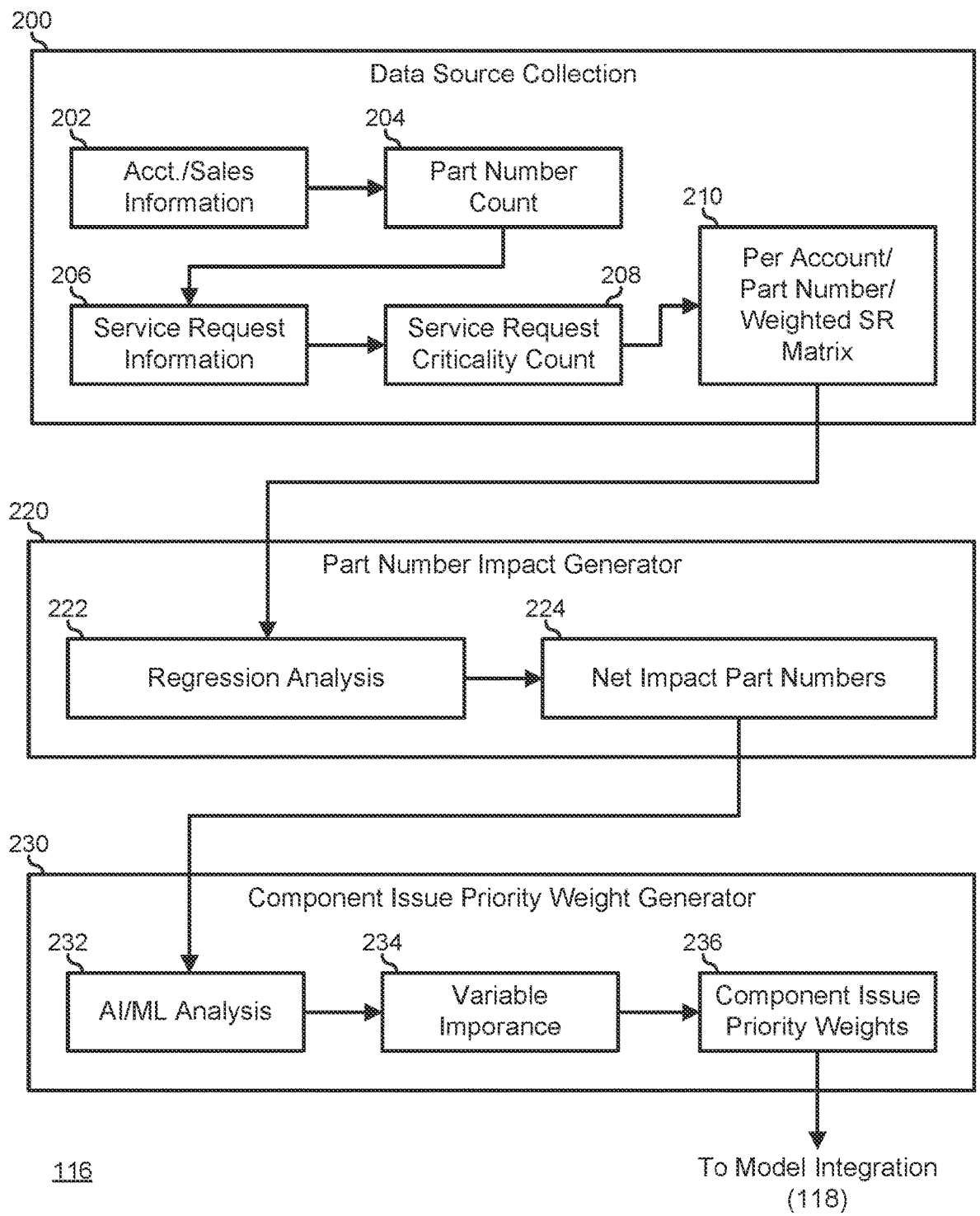
FIG. 2 is a block diagram of a customer service incidents ranking module of the information handling system of FIG. 1.

FIG. 2 illustrates customer service incidents ranking module 116, including a data source collection module 200, a part number impact generator 220, and a component issue priority (CIP) weight generator 230. Data source collection module 200 includes an account and sales information database 202, a part count module 204, a service request information database 206, a service request criticality count module 208, and a per account/part number weighted service request matrix 210. Account and sales information database 202 collects unit sales information for a particular platform or platform family. The unit sales information includes entries for each customer that has purchased the particular platform or platform family. Where the number of customers is very large, a threshold number of platforms purchased may be provided to eliminate consideration of small or one-off purchasers.

The unit sales information may further include account details, configuration information, the individual component part numbers in the purchased platforms, quantities of as sold units, or the like. As used herein, a particular part may have a unique part number as assigned by a manufacturer of the part, and may further include a unique stock keeping unit (SKU) number assigned by the manufacturer of the platform that differs from the part number. For the purposes of the present disclosure, a "part" will be understood to be associated with a single unique "part number" which may include the part manufacture's part number, a platform manufacturer's SKU number, or another identification number that is sufficiently unique to distinguish one part from another, as needed or desired.

Part count module 204 operates to expand the unit sales information to include individual parts, as identified by the associated part numbers, and the quantities of the individual part that have been provided to each account. In a particular embodiment, part count module 204 receives the unit sales information from account and sales information database 202, and forms an account matrix with the individual rows being provided to represent the individual accounts from the unit sales information, and the individual columns being provided to represent the individual parts. Here, each cell of the account matrix is populated with the number of each individual part that was purchased by each account.

Service request information database 206 collects server request information for the platforms as provided in the account matrix. In particular, where a platform manufacturer tracks the service requests for the platforms provided by the manufacture, the manufacturer's service request information database may categorize the resolved service requests based upon one or more part number that was the root cause of the service request. Service request information database 206 adds a service request count cell for each cell of the account matrix, where each request count cell includes a number of service requests that were root caused to each part number for each account. Service request criticality count module 208 then ascribes a criticality value to each service request and sums the criticality values for each part number to provide a per-part-number/per-account service request criticality number.

For example, where a particular platform manufacturer characterizes service requests with five (5) levels of criticality (for example critical, major, moderate, minor, and trivial), then request criticality count module 208 can weight the service request by ascribing critical service requests a value of, for example four (4), major service requests a value of, for example, three (3), moderate service request a value of, for example, two (2), minor service requests a value of, for example, one (1), and trivial service requests a value of, for example, zero (0). Thus, in a further example, if a particular account has made four (4) service requests for a particular part number, and of the four (4) service requests, two (2) were critical, one (1) was moderate, and one (1) was minor, the criticality value for that part number for that account would be equal to:

Criticality value=(2*4)+(1*2)+(1*1)=8+2+1=11

Service requests may be characterized by other numbers of criticality levels (for example more or less than five (5) criticality levels), and other weighting schemes may be employed, as needed or desired.

In a particular embodiment, request criticality count module 208 further operates to normalize the criticality values prior to further processing. Thus, continuing the above example, request criticality count module 208 can derive an average criticality value of:

Average criticality value=(criticality value)/(service requests)=11/4=2.75.

Further, the normalized criticality value may be derived as:

Normalized criticality=(average criticality)/(maximum criticality)=2.75/4=0.6875.

Other methods of normalizing the criticality values may be utilized as needed or desired. Where a particular service request is found to be root caused to more than one part number, then request criticality count module 208 can ascribe a criticality for each of the affected part numbers.

The final product of data source collection module 200 is per account/part number weighted service request matrix 210.

Part number impact generator 220 includes a regression analysis module 222 that generates a net impact part numbers list 224. Regression analysis module 222 receives per account/part number weighted service request matrix 210 and performs a regression analysis on the data to determine a relationship between the part numbers and the associated service request counts. In particular, the coefficients of the regression analysis provide a test significance and a direction of the relationship between the part numbers and the associated service requests. The direction of the relationship provides information as to how a predictor part number impacts the number of the weighted service request count. If the part number coefficients are negative, the predictor variable reduces the number of weighted service requests, implying that those part numbers with negative coefficients do not need to be tested in the validation effort and can be eliminated from the system under test configurations. On the other hand, part numbers which have higher positive coefficients imply that those part numbers a causing a higher number of weighted service requests, and those part numbers need to be given greater significance in determining the system under test configurations.

Component issue priority weight generator 230 receives net impact part numbers list 224. Component issue priority weight generator 230 includes an AI/ML analysis module 232, a variable importance module 234, and a component issue priority weight list 236. In a particular embodiment, AI/ML analysis module 232 represents an automated machine learning (AutoML) based solution that evaluates multiple different ML algorithms, alone, and in combination, to evaluate the relationship between the net impact part numbers as the independent variable and the weighted service request count as the dependent variable. The AutoML-based regressions utilize meta-learnings and ensemble predictions based on which the models are rated to get the best results possible. Similar to the Simple linear regression where the model is evaluated based on the Coefficient of determination ($R^2$), the AutoML solution which is implemented in this proposed solution tries to reach the best $R^2$ a value that can be used for the prediction, in other words, the objective function used is to minimize the Mean Square Error (MSE) loss.

In the current embodiments, the emphasis is more focused on how each of the part number variables impacts the service requests, rather than on predicting of the weighted service request count. Hence with the model training, variable importance 234 is achieved for the best model in place. Variable importance 234 refers to how much a given model utilizes that variable to make accurate predictions. Through variable importance 234, for each part number, a percentage of usability by the algorithm is achieved which is component issue priority weight list 236. In other words, component issue priority weights list 236 represents an impact score for each part number on how much the part numbers are impacting the weighted service request variable across all of the accounts. In a particular embodiment, the AutoML-based analysis derives a best regression model represented by a combination of Gradient-Boosting, Random Forrest, and AdaBoost algorithms that results in a coefficient of determination ($R^2$) of 0.87.

Returning to FIG. 1, module integration module 118 receives the list of possible configurations from configuration modeling module 114 and combines them with the component issue priority weights list 236 to determine a ranked high value system under test list 120. In particular, a set of weight factors is ascribed to the various factors that composed the list of configurations and the component issue priority weights. For example, a platform validation team may utilize their judgement to determine a weight to ascribe to the NUDDs in the platform, to the new components in the platform, the unique commodities in the platform family, the number of as-sold units, and to the component issue priority. Then model integration module 118 combines the individual factor scores for each platform within the possible platform list with the ascribed weights, and sums the elements up to define a platform weight. For example, each platform may receive a weighted score for ranking as:

$$S_{tot}=(W_{NUDD}*S_{NUDD})+(W_{comp}*S_{comp})+(W_{com}*S_{com})+(W_{AS}*S_{AS})+(W_{CIP}*S_{CIP}):$$

where $S_{tot}$ is the system total score, $W_{NUDD}$ is the NUDD weight, $S_{NUDD}$ is the NUDD score, $W_{comp}$ is the component weight, $S_{comp}$ is the component score, $W_{com}$ is the commodities weighte, $S_{com}$, is the commodities score, $W_{AS}$ is the as-shipped weight, $S_{AS}$ is the as-shipped score, $W_{CIP}$ is the component issue priority weight, and $S_{CIP}$ is the component issue priority score. With the ranked list of high value systems under test 120 fully formed, a platform validation team has the tool needed to prioritize the validation efforts on the most important platform configurations.

Figure 3:
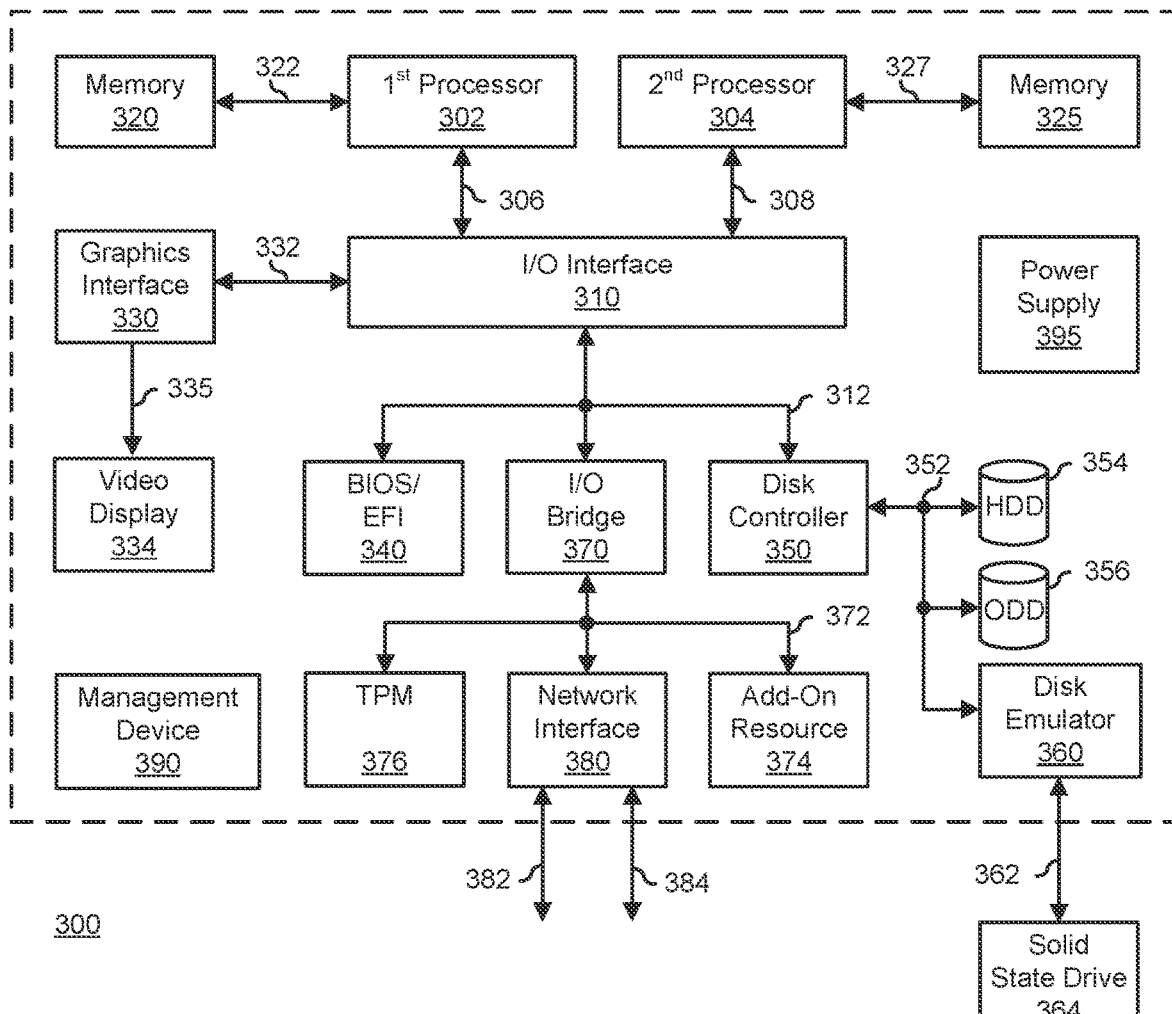
FIG. 3 is a block diagram illustrating a generalized information handling system according to another embodiment of the present disclosure.

FIG. 3 illustrates a generalized embodiment of an information handling system 300. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 300 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 300 can include processing resources for executing machine-executable code, such as a central processing unit (CPU), a programmable logic array (PLA), an embedded device such as a System-on-a-Chip (SoC), or other control logic hardware. Information handling system 300 can also include one or more computer-readable medium for storing machine-executable code, such as software or data. Additional components of information handling system 300 can include one or more storage devices that can store machine-executable code, one or more communications ports for communicating with external devices, and various input and output (I/O) devices, such as a keyboard, a mouse, and a video display. Information handling system 300 can also include one or more buses operable to transmit information between the various hardware components.

Information handling system 300 can include devices or modules that embody one or more of the devices or modules described below, and operates to perform one or more of the methods described below. Information handling system 300 includes processors 302 and 304, an input/output (I/O) interface 310, memories 320 and 325, a graphics interface 330, a basic input and output system/universal extensible firmware interface (BIOS/UEFI) module 340, a disk controller 350, a hard disk drive (HDD) 354, an optical disk drive (ODD) 356, a disk emulator 360 connected to an external solid state drive (SSD) 362, an I/O bridge 370, one or more add-on resources 374, a trusted platform module (TPM) 376, a network interface 380, a management device 390, and a power supply 395. Processors 302 and 304, I/O interface 310, memory 320 and 325, graphics interface 330, BIOS/UEFI module 340, disk controller 350, HDD 354, ODD 356, disk emulator 360, SSD 362, I/O bridge 370, add-on resources 374, TPM 376, and network interface 380 operate together to provide a host environment of information handling system 300 that operates to provide the data processing functionality of the information handling system. The host environment operates to execute machine-executable code, including platform BIOS/UEFI code, device firmware, operating system code, applications, programs, and the like, to perform the data processing tasks associated with information handling system 300.

In the host environment, processor 302 is connected to I/O interface 310 via processor interface 306, and processor 304 is connected to the I/O interface via processor interface 308. Memory 320 is connected to processor 302 via a memory interface 322. Memory 325 is connected to processor 304 via a memory interface 327. Graphics interface 330 is connected to I/O interface 310 via a graphics interface 332, and provides a video display output 335 to a video display 334. In a particular embodiment, information handling system 300 includes separate memories that are dedicated to each of processors 302 and 304 via separate memory interfaces. An example of memories 320 and 325 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 340, disk controller 350, and I/O bridge 370 are connected to I/O interface 310 via an I/O channel 312. An example of I/O channel 312 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 310 can also include one or more other I/O interfaces, including an Industry Standard Architecture (ISA) interface, a Small Computer Serial Interface (SCSI) interface, an Inter-Integrated Circuit (I$^2$C) interface, a System Packet Interface (SPI), a Universal Serial Bus (USB), another interface, or a combination thereof. BIOS/UEFI module 340 includes BIOS/UEFI code operable to detect resources within information handling system 300, to provide drivers for the resources, initialize the resources, and access the resources. BIOS/UEFI module 340 includes code that operates to detect resources within information handling system 300, to provide drivers for the resources, to initialize the resources, and to access the resources.

Disk controller 350 includes a disk interface 352 that connects the disk controller to HDD 354, to ODD 356, and to disk emulator 360. An example of disk interface 352 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 360 permits SSD 364 to be connected to information handling system 300 via an external interface 362. An example of external interface 362 includes a USB interface, an IEEE 1394 (Firewire) interface, a proprietary interface, or a combination thereof. Alternatively, solid-state drive 364 can be disposed within information handling system 300.

I/O bridge 370 includes a peripheral interface 372 that connects the I/O bridge to add-on resource 374, to TPM 376, and to network interface 380. Peripheral interface 372 can be the same type of interface as I/O channel 312, or can be a different type of interface. As such, I/O bridge 370 extends the capacity of I/O channel 312 when peripheral interface 372 and the I/O channel are of the same type, and the I/O bridge translates information from a format suitable to the I/O channel to a format suitable to the peripheral channel 372 when they are of a different type. Add-on resource 374 can include a data storage system, an additional graphics interface, a network interface card (NIC), a sound/video processing card, another add-on resource, or a combination thereof. Add-on resource 374 can be on a main circuit board, on a separate circuit board or add-in card disposed within information handling system 300, a device that is external to the information handling system, or a combination thereof.

Network interface 380 represents a NIC disposed within information handling system 300, on a main circuit board of the information handling system, integrated onto another component such as I/O interface 310, in another suitable location, or a combination thereof. Network interface device 380 includes network channels 382 and 384 that provide interfaces to devices that are external to information handling system 300. In a particular embodiment, network channels 382 and 384 are of a different type than peripheral channel 372 and network interface 380 translates information from a format suitable to the peripheral channel to a format suitable to external devices. An example of network channels 382 and 384 includes InfiniBand channels, Fibre Channel channels, Gigabit Ethernet channels, proprietary channel architectures, or a combination thereof. Network channels 382 and 384 can be connected to external network resources (not illustrated). The network resource can include another information handling system, a data storage system, another network, a grid management system, another suitable resource, or a combination thereof.

Management device 390 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 300. In particular, management device 390 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 300, such as system cooling fans and power supplies. Management device 390 can include a network connection to an external management system, and the management device can communicate with the management system to report status information for information handling system 300, to receive BIOS/UEFI or system firmware updates, or to perform other task for managing and controlling the operation of information handling system 300. Management device 390 can operate off of a separate power plane from the components of the host environment so that the management device receives power to manage information handling system 300 when the information handling system is otherwise shut down. An example of management device 390 includes a commercially available BMC product or other device that operates in accordance with an Intelligent Platform Management Initiative (IPMI) specification, a Web Services Management (WS-Man) interface, a Redfish Application Programming Interface (API), another Distributed Management Task Force (DMTF), or other management standard, and can include an Integrated Dell Remote Access Controller (iDRAC), an Embedded Controller (EC), or the like. Management device 390 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
   a memory to store code; and
   a processor to execute code to instantiate a hardware configuration generator to generate a plurality of platform configurations, the hardware configuration generator configured to:
      provide a ranked list of the platform configurations;
      receive platform customer service request information;
      provide a ranked list of part numbers associated with the platform configurations based upon the customer service request information; and
      modify the ranked list of platform configurations based upon the ranked list of part numbers;
   wherein the ranked list of platforms is determined as a set of system total scores for each platform, the system total score for each platform being determined as:

$$S_{tot}=(W_{NUDD}*S_{NUDD})+(W_{comp}*S_{comp})+(W_{com}*S_{com})+(W_{AS}*S_{AS})+(W_{CIP}*S_{CIP}),$$

where $S_{tot}$ is a system total score, $W_{NUDD}$ is a New, Unique, Distinct, and Difficult (NUDD) element list weight, $S_{NUDD}$ is a NUDD score, $W_{comp}$ is a component weight, $S_{comp}$ is a component score, $W_{com}$ is a commodities weight, $S_{com}$ is a commodities score, $W_{AS}$ is an as-shipped weight, $S_{AS}$ is an as-shipped score, $W_{CIP}$ is an component issue priority weight, and $S_{CIP}$ is a component issue priority score.

2. The information handling system of claim 1, wherein the customer service request information includes information that correlates a number of each of a plurality of part numbers purchased by each of a plurality of customers with a number of service requests for each part number received by each of the customers.

3. The information handling system of claim 2, wherein the customer service request information further ascribes a numerical severity level to each of the service requests.

4. The information handling system of claim 2, wherein, in providing the ranked list of part numbers, the processor is further configured to calculate a sum of the numerical severity levels for each of the part numbers.

5. The information handling system of claim 4, wherein, in providing the ranked list of part numbers, the processor is further configured to calculate a weighted severity for each part number based on the sum of the severity levels and the number of service requests for each part number.

6. The information handling system of claim 5, wherein, in providing the ranked list of part numbers, the processor is further configured to perform a regression analysis on the ranked list of part numbers to derive an impact score for each of the part numbers.

7. The information handling system of claim 6, wherein, in providing the ranked list of part numbers, the processor is further configured to perform a machine learning analysis on the impact scores for each part number to derive the ranked list of part numbers.

8. The information handling system of claim 7, wherein the machine learning analysis includes combining a Gradient-Boosting algorithm, a Random Forrest algorithm, and an AdaBoost algorithm.

9. The information handling system of claim 7, wherein, in providing the ranked list of part numbers, the machine learning analysis is configured to predict, for each part number, a variable impact on the service requests.

10. A method for determining platform configurations, the method comprising:
    instantiating, on an information handling system, a hardware configuration generator to generate a plurality of platform configurations;
    providing, by the hardware configuration generator, a ranked list of platform configurations;
    receiving platform customer service request information;
    providing a ranked list of part numbers associated with the platform configurations based upon the customer service request information; and
    modifying the ranked list of platform configurations based upon the ranked list of part numbers;
    wherein the ranked list of platforms is determined as a set of system total scores for each platform, the system total score for each platform being determined as:

$$S_{tot}=(W_{NUDD}*S_{NUDD})+(W_{comp}*S_{comp})+(W_{com}*S_{com})+(W_{AS}*S_{AS})+(W_{CIP}*S_{CIP}),$$ where $S_{tot}$ is a system total score, $W_{NUDD}$ is a New, Unique, Distinct, and Difficult (NUDD) element list weight, $S_{NUDD}$ is a NUDD score, $W_{comp}$ is a component weight, $S_{comp}$ is a component score, $W_{com}$ is a commodities weight, $S_{com}$ is a commodities score, $W_{AS}$ is an as-shipped weight, $S_{AS}$ is an as-shipped score, $W_{CIP}$ is an component issue priority weight, and $S_{CIP}$ is a component issue priority score.

11. The method of claim 10, wherein the customer service request information includes information that correlates a number of each of a plurality of part numbers purchased by each of a plurality of customers with a number of service requests for each part number received by each of the customers.

12. The method of claim 11, wherein the customer service request information further ascribes a numerical severity level to each of the service requests.

13. The method of claim 11, wherein, in providing the ranked list of part numbers, the method further comprises:
    calculating a sum of the numerical severity levels for each of the part numbers.

14. The method of claim 13, wherein, in providing the ranked list of part numbers, the method further comprises:

calculating a weighted severity for each part number based on the sum of the severity levels and the number of service requests for each part number.

15. The method of claim 14, wherein, in providing the ranked list of part numbers, the method further comprises performing a regression analysis on the ranked list of part numbers to derive an impact score for each of the part numbers.

16. The method of claim 15, wherein, in providing the ranked list of part numbers, the method further comprises performing a machine learning analysis on the impact scores for each part number to derive the ranked list of part numbers.

17. The method of claim 16, wherein the machine learning analysis includes combining a Gradient-Boosting algorithm, a Random Forrest algorithm, and an AdaBoost algorithm.

18. The method of claim 16, wherein, in providing the ranked list of part numbers, method further comprises predicting, for each part number, a variable impact on the service requests.

19. An information handling system, comprising:
a memory to store code; and
a processor to execute the code to instantiate a hardware configuration generator to generate a plurality of platform configurations, the hardware configuration generator configured to:
provide a ranked list of the platform configurations;
receive platform customer service request information, the customer service request information including information that correlates a number of each of a plurality of part numbers purchased by each of a plurality of customers with a number of service requests for each part number received by each of the customers;
provide a ranked list of part numbers associated with the platform configurations based upon the customer service request information; and
modify the ranked list of platform configurations based upon the ranked list of part numbers, the ranked list of platforms being determined as a set of system total scores for each platform, the system total score for each platform being determined as:

$S_{tot} = (W_{NUDD} * S_{NUDD}) + (W_{comp} * S_{comp}) + (W_{com} * S_{com}) + (W_{AS} * S_{AS}) + (W_{CIP} * S_{CIP})$, where $S_{tot}$ is a system total score, $W_{NUDD}$ is a New, Unique, Distinct, and Difficult (NUDD) element list weight, $S_{NUDD}$ is a NUDD score, $W_{comp}$ is a component weight, $S_{comp}$ is a component score, $W_{com}$ is a commodities weight, $S_{com}$ is a commodities score, $W_{AS}$ is an as-shipped weight, $S_{AS}$ is an as-shipped score, $W_{CIP}$ is an component issue priority weight, and $S_{CIP}$ is a component issue priority score.

* * * * *